United States Patent [19]
Goetz et al.

[11] Patent Number: 5,202,371
[45] Date of Patent: Apr. 13, 1993

[54] FREE-FLOWING RUBBER GRANULES

[75] Inventors: Walter Goetz, Ludwigshafen; Eckhard M. Koch, Fussgoenheim; Herbert Gutsche, Beindersheim; Richard Pflueger, Ludwigshafen, all of Fed. Rep. of Germany

[73] Assignee: BASF Aktiengesellschaft, Ludwigshafen, Fed. Rep. of Germany

[21] Appl. No.: 784,077

[22] Filed: Oct. 30, 1991

Related U.S. Application Data

[63] Continuation of Ser. No. 522,041, May 11, 1990, abandoned.

[51] Int. Cl.$^5$ .......... B44D 1/22; B44C 1/08; C08K 3/34
[52] U.S. Cl. .................. 524/447; 524/442; 524/449; 524/456; 524/493; 428/404; 428/407; 427/180; 427/222
[58] Field of Search ............ 524/442, 449, 447, 456, 524/493; 428/404, 407; 427/180, 222

[56] References Cited

U.S. PATENT DOCUMENTS

| | | | |
|---|---|---|---|
| 3,436,243 | 1/1965 | Kruger | 428/404 |
| 3,463,751 | 8/1969 | Hasegawa et al. | 524/178 |
| 3,674,705 | 7/1972 | Hytrek | 524/456 |
| 3,959,209 | 5/1976 | Lake | 525/168 |
| 4,058,124 | 11/1977 | Yen et al. | 524/456 |
| 4,243,568 | 1/1981 | Brown | 524/562 |
| 4,357,439 | 11/1982 | Blümel et al. | 524/493 |
| 4,360,607 | 11/1982 | Thorsrud et al. | 523/137 |
| 4,431,765 | 2/1984 | Doshak et al. | 524/450 |
| 4,485,193 | 11/1984 | Rubens et al. | 521/147 |
| 4,663,383 | 5/1987 | Lowe et al. | 524/493 |

Primary Examiner—Melvyn I. Marquis
Assistant Examiner—Frederick Krass
Attorney, Agent, or Firm—Oblon, Spivak, McClelland, Maier & Neustadt

[57] ABSTRACT

Free-flowing granules of thermoplastic elastomers are obtained by applying a finely divided mineral powder, namely a silicate from the group comprising wollastonite, kaolinite or mica, in an amount of from 0.005 to 0.5%, based on the amount of elastomer, to the surface of the granules.

2 Claims, No Drawings

FREE-FLOWING RUBBER GRANULES

This application is a continuation of application Ser. No. 07/522,041, filed on May 11, 1990, now abandoned.

The present invention relates to the coating of granules of thermoplastic elastomers with a small amount of an (inorganic) mineral dust or powder in order to provide free-flowing properties, in particular also after storage in the compacted state.

Thermoplastic elastomers, for example acid-modified rubbers, as used to improve the impact resistance of thermoplastics, are tacky per se, i.e. they cake together, in some cases irreversibly, which, understandably, makes handling much more difficult.

It has already been proposed to dust rubbers of this type with commercially available agents for improving the free-flowing properties. Such agents usually contain or comprise silica, i.e. silicon dioxide. This is described, for example, in EP-A-234,565.

Other minerals, salts and comparable substances have also already been proposed for this purpose, including kaolin, clay and talc (U.S. Pat. No. 3,463,751).

The last-mentioned U.S. patent reveals that all these agents are used in relatively large amounts (for example 25% of kaolin), and it must be remembered that the rubbers dealt with in the patent are in the form of a finely divided dispersion. However, for finishing of rubbers used to modify thermoplastics, a high proportion of mineral substances is in many cases unacceptable, and the object is thus to indicate an agent for dusting thermoplastic polymers which is sufficiently effective in an amount of 0.5% or less, based on the rubber.

We have found that this object is achieved by finely divided silicates, namely wollastonite, kaolin or mica, which, when used in very small amounts, produce extremely good free-flowing properties in rubbers.

In principle, the invention can also be used for all finely divided thermoplastic elastomers. Specific rubbers are those which, when blended with polymers, improve the impact resistance compared with the pure polymers, for example those which improve the impact resistance of polyamide.

In general, these are copolymers preferably built up from at least two of the following monomers as the principal components: ethylene, propylene, butadiene, isobutene, isoprene, chloroprene, vinyl acetate, styrene, acrylonitrile and acrylates and methacrylates having 1 to 18 carbon atoms in the alcohol component.

Rubbers which contain reactive components which facilitate adhesion to the amine or carboxyl end groups of the polyamide are preferred. Specific reactive components are olefinically unsaturated carboxylic acids and anhydrides thereof.

Rubbers of this type are described, for example, in Houben-Weyl, Methoden der organischen Chemie, Vol. 14/1 (Georg-Thieme-Verlag, Stuttgart, 1961), pages 392 to 406, and in the monograph by C. B. Bucknall, "Toughened Plastics" (Applied Science Publishers, London, 1977).

Some preferred types of such elastomers are presented below.

The first preferred group comprises ethylene-propylene monomer (EPM) or ethylene-propylene-diene monomer (EPDM) rubbers, which preferably have an ethylene:propylene ratio in the range from 40:60 to 90:10.

The Mooney viscosities (MLI+4/100° C.) of uncrosslinked EPM or EPDM rubbers of this type (gel contents generally less than 1% by weight) are preferably in the range from 25 to 100, in particular from 35 to 90 (measured in accordance with DIN 53 523 on the large rotor after 4 minutes at 100° C).

In general, EPM rubbers contain virtually no double bonds, while EPDM rubbers may contain 1 to 20 double bonds/100 carbon atoms.

Specific examples of diene monomers for EPDM rubbers are conjugated dienes, such as isoprene and butadiene, non-conjugated dienes having 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and cyclopentadiene, and alkenylnorbornenes, such as 5-ethylidene-2-norbornene, 5-butylidene-2-norborne 2-methallyl-5-norbornene, and 2-isopropenyl-5-norbornene, and tricyclodienes, such as 3-methyltricyclo(5.2.1.0.2.6)-3,8-decadiene, or mixtures thereof. Hexadiene-1,5,5-ethylidenenorbornene and dicyclopentadiene are preferred. The diene content of the EPDM rubbers is preferably from 0.5 to 50% by weight, in particular from 1 to 8% by weight, based on the total weight of the rubber.

EPM and EPDM rubbers may preferably also be grafted with reactive carboxylic acids or derivatives thereof. Reference is only made here to acrylic acid, methacrylic acid and derivatives thereof, and maleic anhydride.

A further group of preferred rubbers are copolymers of ethylene with acrylic acid and/or methacrylic acid and/or the esters of these acids. In addition, the rubbers may also contain dicarboxylic acids, for example maleic acid and fumaric acid, or derivatives of these acids, for example esters and anhydrides, and/or epoxy groups. These dicarboxylic acid derivatives or epoxy groups are preferably introduced into the rubber by adding dicarboxylic acid- or epoxy-containing monomers of the general formula I or II or III or IV to the monomer mixture

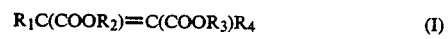

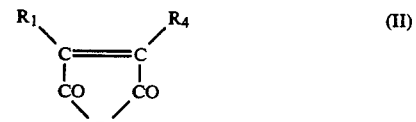

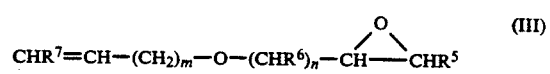

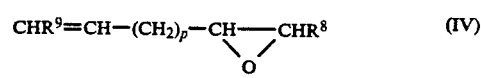

where $R^1$–$R^9$ are hydrogen or alkyl having 1 to 6 carbon atoms, and m is an integer from 0 to 20, n is an integer from 0 to 10 and p is an integer from 0 to 5.

$R^1$–$R^7$ are preferably hydrogen, and m has the value 0 or 1, and n is 1. The corresponding compounds are maleic acid, fumaric acid, maleic anhydride, alkyl glycidyl ethers or vinyl glycidyl ether.

Preferred compounds of the formulae I, II and III are maleic acid, maleic anhydride and epoxy-containing esters of acrylic acid and/or methacrylic acid, glycidyl acrylate and glycidyl methacrylate being particularly preferred.

The ethylene content of the copolymers is generally in the range from 50 to 98% by weight, and the proportions of epoxy-containing monomers and of acrylates and/or methacrylates are each in the range from 1 to 49% by weight.

Particularly preferred copolymers are those comprising 50 to 98% by weight, in particular 60 to 95% by weight, of ethylene, 0.5 to 40% by weight, in particular 3 to 20% by weight, of glycidyl acrylate and/or glycidyl methacrylate, acrylic acid and/or maleic anhydride, and 1 to 45% by weight, in particular 10 to 35% by weight, of n-butyl acrylate and/or 2-ethylhexyl acrylate.

Further preferred esters of acrylic acid and/or methacrylic acid are the methyl, ethyl, propyl and i- or t-butyl esters.

In addition, vinyl esters and vinyl ethers may also be employed as comonomers.

The above-described ethylene copolymers can be prepared by processes which are known per se, preferably by random copolymerization under superatmospheric pressure and at elevated temperature. Appropriate processes are described in the literature.

The melt flow index of ethylene copolymers is generally in the range from 1 to 80 g/10 min (measured at 190° C. and a load of 2.16 kg).

Preferred elastomers (rubbers) B) are furthermore graft copolymers with butadiene, butadiene/styrene, butadiene/acrylonitrile and acrylate graft bases, as described, for example, in DE-A-1,694,173 and DE-A-2,348,377.

Of these, the ABS polymers, as described in DE-A-2,035,390, DE-A-2,248,242 and EP-A-22,216, should be particularly mentioned, the latter being particularly preferred.

Rubber granules according to the invention have, for example, a grain size of generally from 1 to 20 mm, preferably from 3 to 10 mm.

The amount of dusting agent used is generally less than 0.5%, based on the rubber, for example from 0.005 to 0.2%, in particular from 0.02 to 0.005%.

The invention is surprising since other, conventional dusting agents, for example based on calcium compounds, even when used in relatively large amounts, have a significantly weaker action or are inactive.

EXAMPLE

In each case, 1 kg of a commercially available rubber (Exxelor VA 1801 from EXXON Chemicals) is dusted with 250 mg of mineral and stored for one week in a plastic bag under a 10 kg weight. The bag is then cut open lengthwise and rotated, and the proportion of granules flowing out of the bag compared to the total amount of rubber granules is determined.

| Mineral | Obtainable as (tradename) | Manufacturer or Supplier | % of granules flowing out |
| --- | --- | --- | --- |
| Wollastonite | Wicroll 10 | Omya, Finland | 100 |
| Kaolin | Polarite 102 A | English China Clay Inc. | 100 |
| Mica | Micalink | CMMP, France | 100 |
| Comparison | | | |
| Calcium sulfate | | | 11 |
| Calcium carbonate | | | 19 |
| No dusting | | | 0 |

We claim:

1. A process for the preparation of free-flowing granules of a thermoplastic elastomer which comprises admixing granules of a thermoplastic elastomer of a granular size of from 1 to 20 mm with 0.005 to 0.2%, based on the amount of elastomer, of a finely divided powder of a silicate selected from the group consisting of wollastonite, kaolinite and mica, said finely divided powder being applied to the surfaces of the granules.

2. Free-flowing granules of a thermoplastic elastomer comprising granules of a thermoplastic elastomer of a granular size of from 1 to 20 mm having applied to the surface of the granules 0.005 to 0.2%, based on the amount of elastomer, of a finely divided powder of a silicate selected from the group consisting of wollastonite, kaolinite and mica.

* * * * *